(12) United States Patent  
Butcher (10) Patent No.: US 7,717,232 B2
(45) Date of Patent: May 18, 2010

(54) LADDER STAND WITH OPTIONAL EXTENSION MEMBER, KIT FOR CONSTRUCTING HEIGHT-ADJUSTABLE LADDER STAND, AND METHOD OF USING SAME

(75) Inventor: Robert Butcher, Flushing, MI (US)

(73) Assignee: Gorilla Inc., Flushing, MI (US)

( * ) Notice: Subject to any disclaimer, the term of this patent is extended or adjusted under 35 U.S.C. 154(b) by 34 days.

(21) Appl. No.: 11/936,477

(22) Filed: Nov. 7, 2007

(65) Prior Publication Data

US 2008/0105490 A1   May 8, 2008

Related U.S. Application Data

(60) Provisional application No. 60/857,430, filed on Nov. 7, 2006.

(51) Int. Cl.
*E04G 7/26* (2006.01)

(52) U.S. Cl. .................. 182/178.3; 182/178.5; 182/116; 182/178.4

(58) Field of Classification Search .............. 182/178.5, 182/178.4, 178.3, 178.2, 116
See application file for complete search history.

(56) References Cited

U.S. PATENT DOCUMENTS

| | | | |
|---|---|---|---|
| 3,391,757 A * | 7/1968 | Duke et al. ................... | 182/17 |
| 4,086,980 A * | 5/1978 | Shortes et al. ............... | 182/151 |
| 4,687,076 A * | 8/1987 | Tu ........................... | 182/178.2 |
| 4,782,918 A | 11/1988 | Brunner et al. | |
| 4,905,792 A | 3/1990 | Wilson | |
| 5,009,283 A | 4/1991 | Prejean | |
| 5,279,390 A | 1/1994 | Phillips | |
| 5,368,127 A * | 11/1994 | Phillips ..................... | 182/187 |
| 5,465,933 A | 11/1995 | Todd | |
| 5,518,083 A | 5/1996 | Blennert | |
| 5,791,436 A * | 8/1998 | Talley, Sr. ................... | 182/116 |
| 5,839,538 A | 11/1998 | Magyar | |
| 6,053,278 A * | 4/2000 | Myers ......................... | 182/20 |
| 7,021,423 B1 * | 4/2006 | Pestrue et al. ............... | 182/116 |
| 2005/0148275 A1 * | 7/2005 | Mataja et al. ................. | 446/7 |

* cited by examiner

*Primary Examiner*—Katherine W Mitchell
*Assistant Examiner*—Daniel Cahn
(74) *Attorney, Agent, or Firm*—Carrier, Blackman & Associates, P.C.; William D. Blackman; Joseph P. Carrier (57) ABSTRACT

A portable ladder stand for supporting a hunter or naturalist above the ground includes a ladder portion, an upper assembly portion and a seat portion. The ladder portion includes a plurality of components including an intermediate ladder segment, ladder extension segment and lower ladder segment. The ladder segments are include vertical rails and horizontal rungs extending between the rails, and the segments are nestingly connected together. The vertical rails include male peg connectors and female socket connectors that are configured in such a way as to limit the number of ladder extension segments that can be included in the ladder portion of the ladder stand.

13 Claims, 6 Drawing Sheets

No ladder extension

Fig. 6B

One ladder extension

Fig. 6C

Square peg does not fit in round hole (only one extension can be used)

LADDER STAND WITH OPTIONAL EXTENSION MEMBER, KIT FOR CONSTRUCTING HEIGHT-ADJUSTABLE LADDER STAND, AND METHOD OF USING SAME

CROSS-REFERENCE TO RELATED APPLICATIONS

The present invention claims priority under 35 USC 119 based on U.S. provisional patent application No. 60/857,430, filed Nov. 7, 2006. The complete disclosure of the referenced provisional application is incorporated by reference herein.

BACKGROUND OF THE INVENTION

1. Field of the Invention

The present invention relates to hunting elevation devices. More particularly, the present invention relates to portable ladder stands, for use by outdoor enthusiasts in climbing to an elevated position. Even more particularly, the present invention relates to a ladder stand extension for raising the height of a ladder stand, to a height-adjustable ladder stand including the extension, and to a kit for and method of assembling an extended-height ladder stand from components.

2. Description of the Background Art

There are many known climbing and elevated support devices for elevating the position of a hunter or naturalist in the field. The known support devices vary greatly in terms of their function and ability. For example, some of the known devices include:

tree stands, which encompass two general varieties, climbing and non-climbing, both of which suspend the hunter or naturalist at a desired height, and secure solely to a tree;

ladder stands, which elevate the hunter or naturalist to a maximum height relative to the length of the ladder, and which require the assistance of a tree for support and securement; and tripods, which do not require the assistance of a tree for support, yet which elevate the hunter or naturalist relative to the ground.

While any device within the above three general categories will elevate the location of a hunter or naturalist on many types of terrain, each will perform better than the others given certain field conditions. By way of example, a hunter or naturalist would opt for a tree stand when the forest or vegetation canopy is high; thereby enabling the hunter or naturalist to position himself at or near the top of the canopy, for optimum concealment.

Alternatively, when ground cover or brush is high, a hunter or naturalist may opt for a ladder stand to position himself slightly above the ground cover for maximum concealment and optimal visibility. As another option, a hunter of naturalist may choose a self-supporting tripod when the terrain does not include trees of suitable girth for securing a tree stand or ladder stand.

As a result, there exists a demand for each of the three general categories of elevated stands. Like all of the general categories, within the category of ladder stands there exist many variations on the general concept, which include an array of methods for attachment to the tree, seating and platform configurations, portability/collapsibility, etc.

Some known devices that depict ladder stands with various seating and platform configurations are illustrated in U.S. Pat. Nos. 4,782,918, 4,905,792, 5,009,283, 5,279,390, 5,368,127, 5,465,933, 5,518,083, 5,791,436, and 5,839,538.

Brunner et al., U.S. Pat. No. 4,782,918, entitled, "Portable Collapsible Tree Stand," discloses a foldably collapsible tree stand, which does not include a ladder. Part of the structure disclosed in the Brunner reference includes a seat which is pivotally attached to a seat mounting extension, for pivotal movement between extended and retracted positions thereof.

Prejean, U.S. Pat. No. 5,009,283, entitled, "Hunting Stand System," discloses a foldably collapsible hunting stand, which may include a ladder. The hunting stand of Prejean includes a movable seat which is pivotally mounted on a central post.

Blennert, U.S. Pat. No. 5,518,083, entitled, "Swing Arm Tree Stand," discloses a portable tree stand including a base for attaching to a tree, and a platform pivotally connected to the base by a swing arm. The base is held to a tree by chains or the like. A pair of lugs, secured to the base, pivotally support the swing arm therebetween. A seat is fastened to the distal end of the swing arm.

Pestrue et al, U.S. Pat. No. 7,021,423, entitled "Ladder Stand With Adjustable Implement Rest And Pivotally Movable Flip-up Seat", discloses a portable ladder stand including a pivotally attached seat to permit the hunter or naturalist to change from a seated position to a standing position, or vice versa, as needed. The stand of Pestrue et al. further includes a plurality of adjustable accessory rests.

While the aforementioned inventions provide a variety of climbing devices to assist the hunter or naturalist who wishes to stand or sit in an elevated position, a need still exists in the art for a ladder stand which allows for a limited height adjustment to accommodate different hunting situations, but which structurally limits the maximum achievable height attainable for safety reasons.

DETAILED DESCRIPTION

Figure 1:
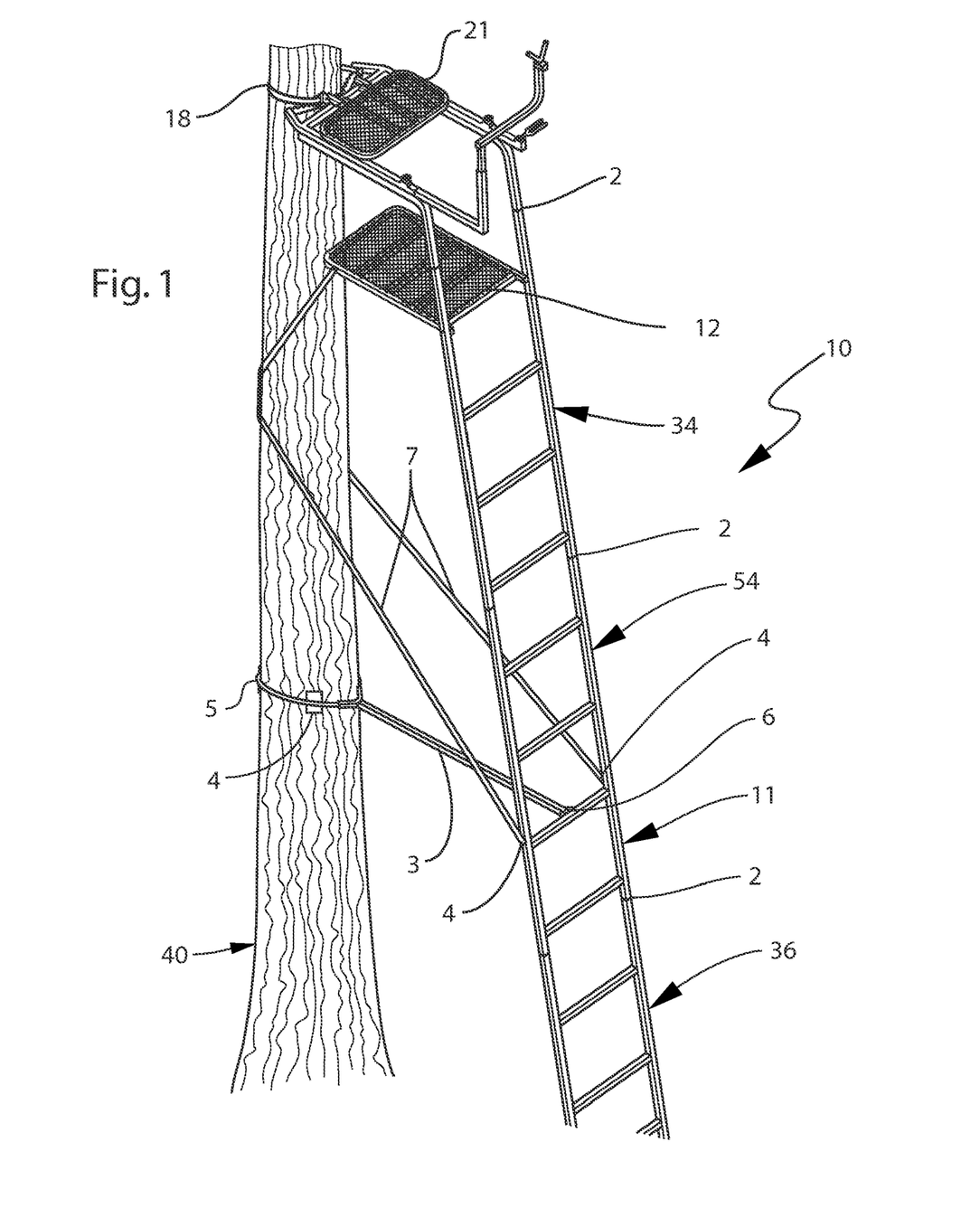
FIG. 1 is a perspective view of a ladder stand according to an illustrative embodiment of the invention.
Figure 2:
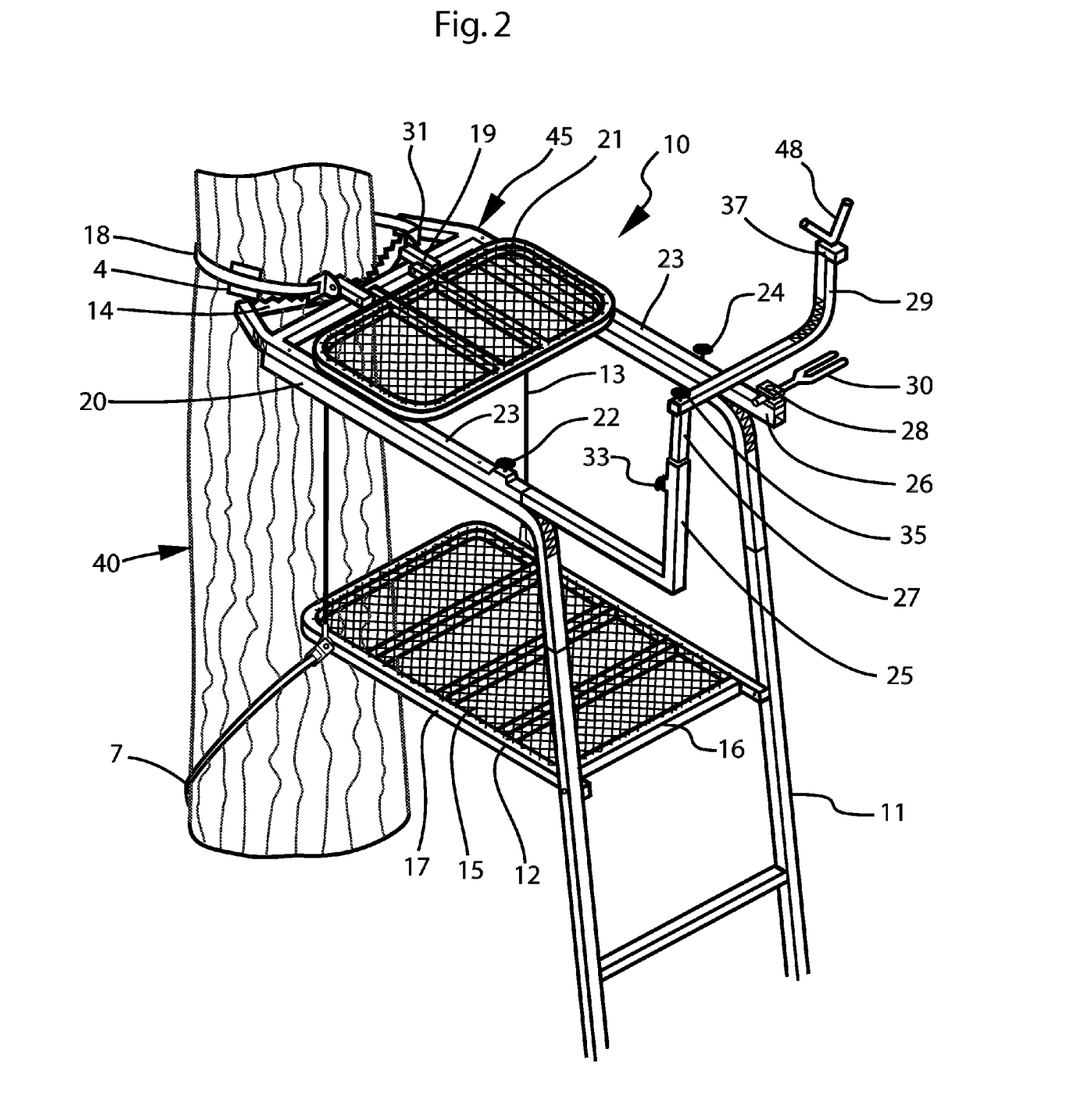
FIG. 2 is an enlarged perspective view of a top section of the ladder stand of FIG. 1, focusing on the standing platform, pivotally attached seat, and implement rests.

Referring to FIGS. 1 and 2, a ladder stand according to an illustrative embodiment of the present invention is shown generally at 10. The ladder stand 10 generally includes a ladder 11, a standing platform 12, and an upper frame assembly 45 supporting a pivotally movable seat 21.

The ladder stand 10 is provided to be used with a vertical support 40. It will be understood that the vertical support 40 does not form a part of the ladder stand 10 according to the present invention, but instead, the ladder stand is intended to be used in conjunction with a free standing vertical support, which will usually be a tree.

Throughout the present specification, relative positional terms like 'upper', 'lower', 'front', 'rear', 'top', 'bottom', 'horizontal', 'vertical', and the like are used to refer to the orientation of the apparatus as shown in the drawings. These terms are used in an illustrative sense to describe the depicted embodiments, and are not meant to be limitative. It will be understood that the depicted apparatus may be placed at an orientation different from that shown in the drawings, such as inverted 180 degrees or transverse to that shown, and in such a case, the above-identified relative positional terms will no longer be accurate. These relative positional terms are used herein to describe components the ladder stand in the installed configuration thereof, as shown in FIGS. 1 and 2.

Specifically referring to FIG. 1, the ladder 11, in the depicted embodiment, is a multi-rung ladder, extending to a predetermined height, and constructed of a strong, lightweight material such as aluminum, steel, metal alloy, or high-strength plastic. The ladder 11 may be formed from hollow tubing to minimize the weight thereof.

As shown in FIG. 1, the ladder 11 may be made up of several interlocking ladder segments 34, 54, 36 which fit nestingly together, and which are joined at the ends 2 thereof.

The number of ladder segments 34, 54, 36 used may vary, depending on the application, thereby enabling the hunter or naturalist to either increase or decrease the height of the seating platform 21 and the standing platform 12, by adding or removing segments. In particular, a ladder extension member 54 according to the present invention (FIGS. 5, 6B) may be placed between a lower segment 36 and an upper segment 34, to extend the effective height of the stand 10. However, as will be further detailed therein, the present invention contemplates limiting the number of extensions which may be used to raise the effective height of the ladder 11.

A first illustrative embodiment of a system for limiting the number of extension members usable with the ladder stand 10 will now be described. The system hereof is intended to limit the number of usable extension members to one, thereby limiting the maximum effective height of the stand, which can be attained by a normal user.

Connecting Adjacent Segments without Extension Member

Figure 4:
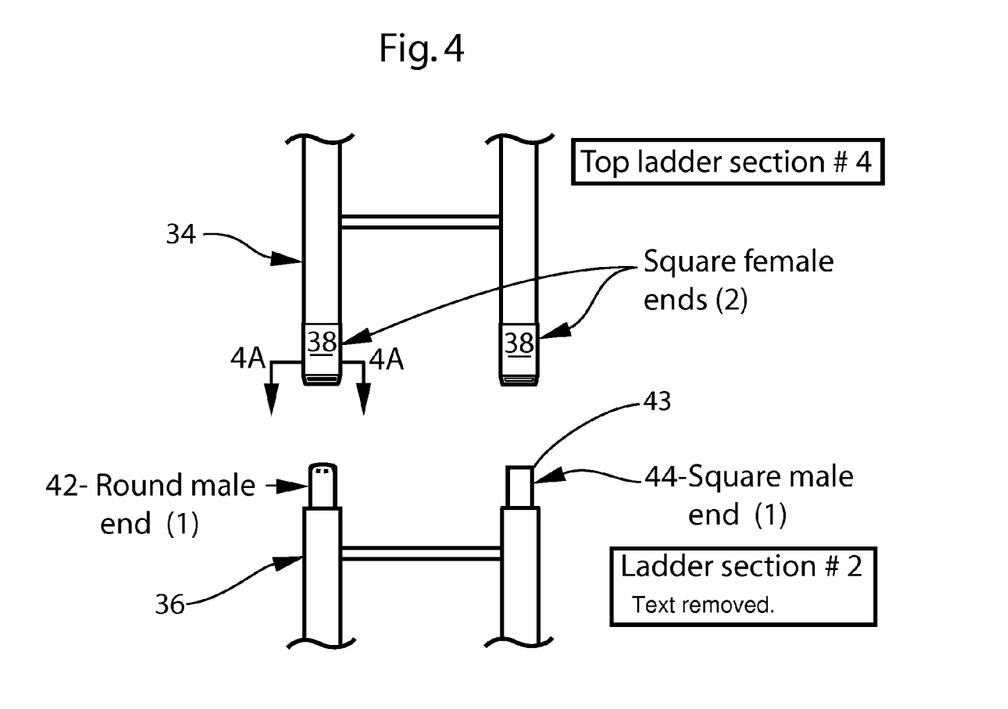
FIG. 4 is a detail front plan view showing two sections of the ladder stand being assembled without any extension therebetween.
Figure 4A:
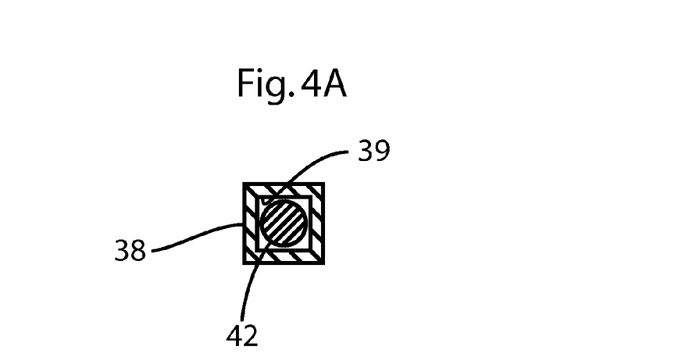
FIG. 4a is a detail sectional view of the ladder stand segments of FIG. 4, taken along the line 4a-4a therein.
Figure 6A:
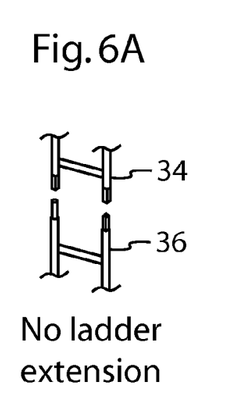
FIG. 6A is a detail perspective view showing two sections of the ladder stand being assembled without any extension therebetween.

Referring now to FIGS. 4, 4a and 6A, each of the bottom end portions of the upper segment 34 is provided with a square female connection member 38, having a square female socket 39 formed therein (FIG. 4a).

The top left tip portion 42 of the lower segment 36 is formed as a cylindrical peg having a round cross-section, which is configured and dimensioned to fit inside of the square socket 39 of a square female connection member 38, as shown in FIG. 4a.

In contrast to the above, the top right tip portion 43 of the lower segment 36 is formed as a rectangular block-shaped peg 44 having a square cross-sectional shape, which is also separately configured and dimensioned to fit snugly inside of the square socket 39 of a square female connection member 38. Therefore, although the tip ends 42, 43 of the lower segment 36 are formed with different shapes, they each fit inside of the respective corresponding square sockets 39 at the bottom ends of the upper segment 34.

Connecting Adjacent Segments with Extension Member Added

Figure 5:
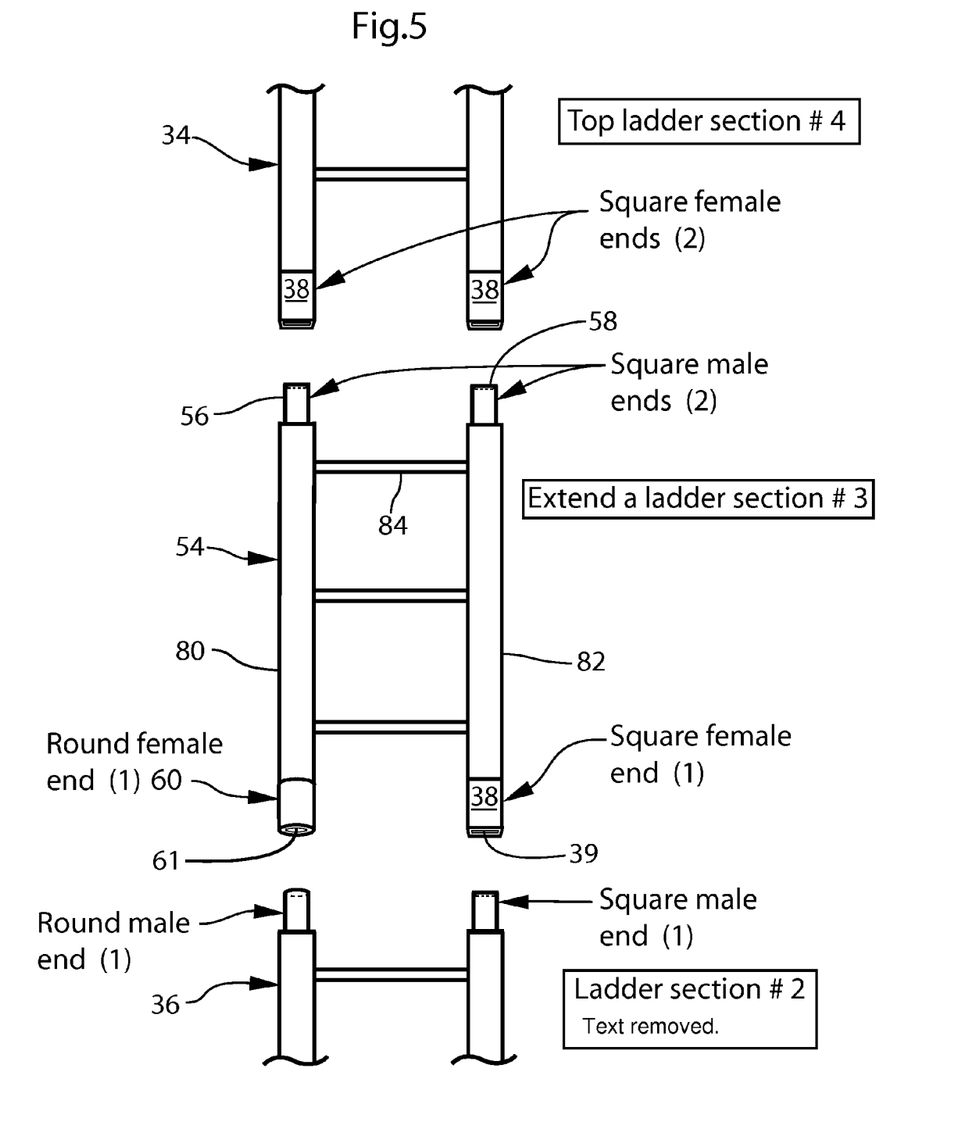
FIG. 5 is a detail front plan view showing two sections of the ladder stand being assembled with an extension therebetween.
Figure 6B:
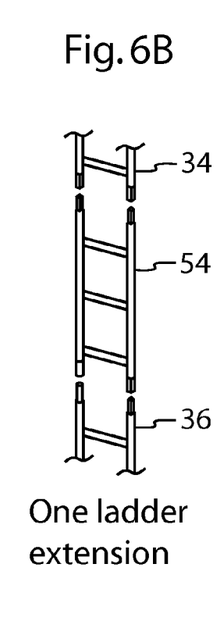
FIG. 6B is a detail perspective view showing two sections of the ladder stand being assembled with an extension therebetween.

Referring now to FIGS. 5 and 6B, assembling the ladder stand 10, using the extension member 54 in between the lower segment 36 and the upper segment 34, will now be described.

As previously noted, each of the bottom end portions of the upper segment 34 is provided with a square female connection member 38, having a square female socket 39 formed therein.

The extension member 54 includes two spaced-apart side portions 80, 82 interconnected by a series of horizontal rungs 84.

Each of the top left and top right tip portions 56, 58 of the extension member side portions 80, 82 is formed as a rectangular block-shaped peg having a square cross-sectional shape, which is configured and dimensioned to fit snugly inside of a respective square socket 39 of a square female connection member 38. Therefore, each of the square tip ends 56, 58 of the extension member 54 are formed with similar shapes, which fit inside of the respective corresponding square sockets 39 at the bottom ends of the upper segment 34.

The bottom end of the extension member 54 has differently-shaped sockets on the respective side portions 80, 82. The bottom end of the left side portion 80 has a cylindrical connector 60 with a cylindrical socket 61 formed therein. This cylindrical socket 61 is configured to receive only a cylindrical peg 42 therein, and will not accept a square peg 44. The bottom end of the right side portion 82 is provided with a square female connection member 38, having a square female socket 39 formed therein. This square female socket 39 is configured to receive either a square peg or a round peg therein.

As shown in FIG. 5 and as previously discussed, the top left tip portion 42 of the lower segment 36 is formed as a cylindrical peg having a round cross-section, which is configured and dimensioned to fit inside of either a square socket 39 of a square female connection member 38, or a cylindrical socket 61 of a cylindrical connection member 60.

The top right tip portion 43 of the lower segment 36 is formed as a rectangular block-shaped peg 44 having a square cross-sectional shape, which is also separately configured and dimensioned to fit snugly inside of the square socket 39 of a square female connection member 38. Therefore, the tip ends 42, 43 of the lower segment 36 are formed with different shapes, which correspond exactly to fit inside of the respective corresponding sockets 61, 39 at the bottom ends of the extension member 54.

Figure 6C:
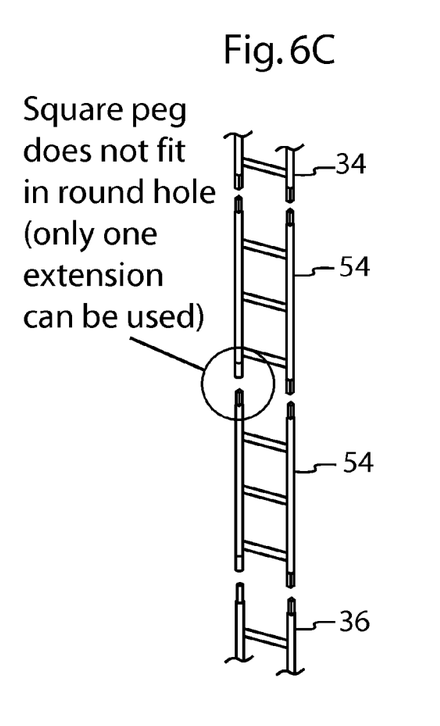
FIG. 6C is a detail perspective view showing two sections of the ladder stand trying to be assembled with two extensions therebetween, which will not work.

Referring now to FIG. 6C, if a user attempts to interconnect two extension members 54, 54 between the upper segment 34 and the lower segment 36, in an effort to obtain greater height for the ladder stand 10, this cannot be done, because while the upper end of the upper extension member can engage with the upper segment 34 as shown in FIG. 5, and the lower end of the lower extension member can engage with the lower segment 36 as shown in FIG. 5, you cannot connect the two extension members together, because you cannot fit the square peg 56 of the lower extension member 54 into the round (cylindrical) hole 61 of the upper extension member 54. This substantially prevents a normal user from using more than one extension member 54 in the assembled ladder stand 10.

The interconnecting ladder segments 34, 54, 36 may be disassembled to provide for a more convenient mode of storing and/or transporting the apparatus 10.

Alternatively, in a different and alternative embodiment from that described above, the individual ladder segments 34, 54, 36 may be pivotally hinged at the segment ends 2 thereof, enabling the ladder 11 to be collapsibly folded to facilitate storage and transportation of the apparatus 10.

Further referring to FIG. 1, the apparatus 10 incorporates a plurality of securing members 5, 7, and 18, for removably attaching the ladder stand 10 to a tree or pole.

As an optional feature, the apparatus 10 according to the present invention may include a substantially Y-shaped anchor arm 3, situated below the standing platform 12 at an intermediate portion of the ladder 11, for abutting placement against a vertical support 40 such as a tree or pole. Where used, the anchor arm 3 may be made removably attachable to the ladder 11 at a predetermined point 6.

Alternatively, the anchor arm 3 may be pivotally attached to the ladder 11 at the predetermined point 6, so as to be foldable thereon. The anchor arm 3, where used, is constructed of similar material to that of the ladder 11. The anchor arm 3 may include a substantially Y-shaped end opposite the end secured to the ladder 11, for removable attachment to a vertical support 40 by way of a first securing strap 5.

According to a preferred embodiment, the first securing strap 5 is constructed of a strong woven cloth material, and tightens to the tree or pole by way of a conventional ratcheting system 4.

Alternatively, the first securing strap 5 may be constructed of chain, braided wire, leather, or other flexible material capable of being securely fastened. Further as an alternative to the ratcheting system 4, another mechanism may be implemented such as one or more buckles or a draw-tight assembly.

Additionally in FIG. 1, the apparatus 10 includes relatively long stabilizing straps 7, which are constructed of material similar in kind to that of the first securing strap 5, and are tightened by way of a ratcheting system 4, or other tightening mechanism as discussed in connection with the first securing strap 5.

A first end of each of the stabilizing straps 7 may be attached to a free end of the standing platform 12, as shown. When the apparatus 10 is assembled and connected to a vertical support 40, as shown, the stabilizing straps 7 extend downward from either side of the standing platform 12, traverse around the vertical support 40, and reattach to the ladder 11 at a predetermined location. In the depicted embodiment, the stabilizing straps 7 may be reattached to the ladder 11 at an area substantially near the anchor arm 3. The stabilizing straps 7 reduce sway or twisting of the apparatus 10, thereby providing increased stability.

However, in an alternative embodiment of the apparatus 10, the stabilizing straps 7 may be removed or may solely secure around the vertical support 40 near the standing platform 12.

Referring to FIG. 2, the upper section of the apparatus 10 is shown in greater detail. The standing platform 12 may be pivotally attached to an upper ladder section, with one or more stop members such as the suspension cables 13 limiting downward movement of the free end thereof, relative to the upper frame assembly 45.

Alternatively, rather than being pivotally attached, the standing platform 12 may be rigidly affixed to the upper section of the ladder 11.

Extending outwardly from the ladder 11, the standing platform 12 includes a rectangular or substantially U-shaped perimeter 17, a plurality of cross members 16 and a grate-like top surface 15. The perimeter 17 and the cross members 16 are constructed from the same material as the ladder 10. The top surface 15 of the standing platform 12 may be composed of a metal grate or heavy-gauge screen which provides a number of advantages, namely drainage of rain and debris, non-skid surface for the user, and increased strength of the platform 12. Alternatively, another material such as vented aluminum, high-strength plastic or wood may provide similar advantages.

While the standing platform 12 is secured to the ladder 11 by rivets, bolts or other conventional fasteners, it is preferred that the standing platform 12 is adapted to be further secured to a vertical support 40 by way of the stabilizing straps 7 (as previously discussed with reference to FIG. 1), when the apparatus 10 is fully assembled and deployed in the field.

Additionally, the standing platform 12 may be further supported by suspension cables 13, which may interconnect the standing platform to an upper frame assembly 45 attached to the top of the ladder 11. Where used, the suspension cables 13 secure the free end of the standing platform 12 to the reinforcing rails 20 of the upper frame assembly 45.

The suspension cables 13 may be made of a plastic-coated braided wire. Alternatively, the suspension cables 13 may be constructed from a single strand of flexible elongate material of sufficient gauge to ensure safe operation. In accordance with the preferred embodiment, the standing platform 12 may be truncated so that the free end thereof does not directly engage the vertical support 40, save the contact between the additional support straps 7 and the vertical support.

Alternatively, dual contact may be established with the vertical support 40 from both the seat section and the standing platform 12, if desired.

As an alternative to the use of the cables 13, equivalent structure could be provided by solid tubular members (not shown) substituted in place of the cables.

Figure 3:
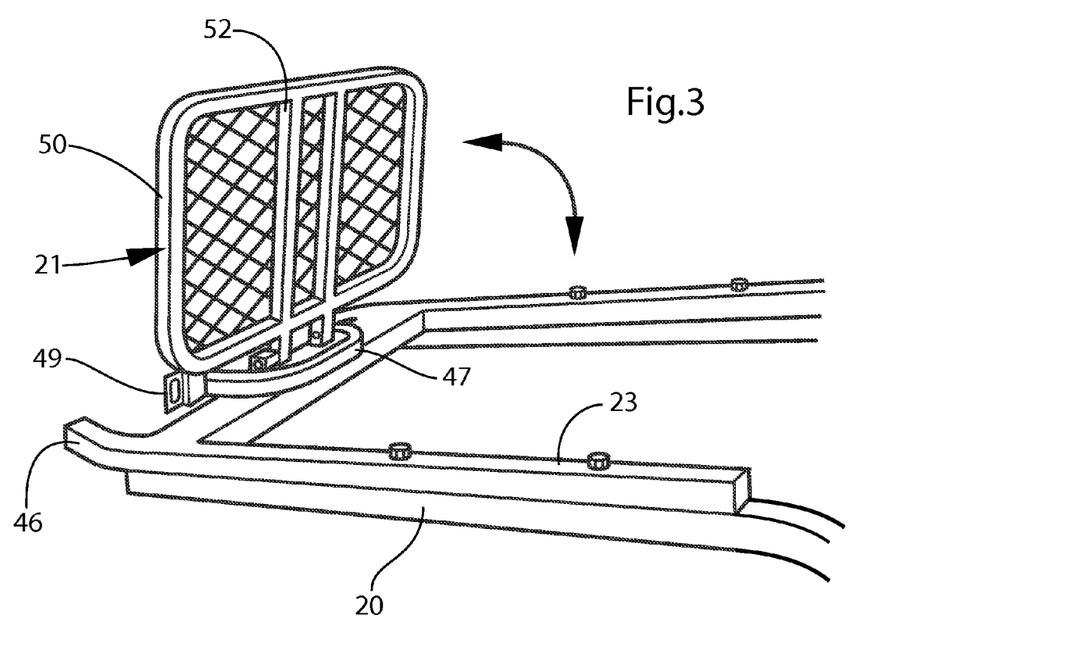
FIG. 3 is a detail perspective view of a seating platform and upper frame assembly, which is a component of the apparatus of FIGS. 1-2, showing the seating platform in a flipped-up position.

Further referring to FIG. 2, in the installed position thereof, the ladder 11 leans inwardly toward the vertical support 40, and connects with an upper frame assembly 45 at the uppermost portion of the apparatus 10. The upper frame assembly 45 is disposed substantially parallel to the ground. In the embodiment of FIGS. 1-3, the upper frame assembly includes a pair of spaced apart L-shaped reinforcing rails 20, which nestingly engage the ladder ends.

The upper frame assembly 45 also includes an adjustment brace 23 secured to the reinforcing rails 20, as shown. The adjustment brace 23 is substantially U-shaped, similar in scale to that of the reinforcing rails 20 and constructed of similar material.

Also in the embodiment of FIGS. 1-3, a pair of spaced apart, integrally formed support studs 46 (FIG. 3) are provided extending outwardly at the corners of the adjustment brace 23, to support the ends of an angular blade 14.

The saw-toothed, angular blade 14 and a securing strap 18 with ratcheting system 4 and hooks 31 are located along the rearmost section of the adjustment brace 23. The angular blade 14 and securing strap 18 are provided to removably attach the upper frame section 45 of the apparatus 10 to a vertical support 40 such as a tree or pole. The angular blade 14 is attached to the support studs 46 using strong fasteners, such as nuts and bolts. The securing strap 18 and ratcheting system 4 are of similar construction and function to those previously discussed, and incorporate similar alternative embodiments.

The saw-toothed, angular blade 14 is constructed of rigid material such as aluminum, steel alloy metal, or other material suitable for engaging the exterior surface of a tree or wooden pole, while the hooks 31 are constructed of similar material, but may, as an alternative embodiment, be replaced by a durable clip or carabiner (not shown) of material suitable to handle the stress incurred as a result of tightening the securing strap 18 and supporting the weight of the hunter or naturalist.

Referring now to FIG. 3, it will be seen that a substantially C-shaped limit bar 47 is fixedly attached to the adjustment brace 23, to limit downward movement of the seat platform 21. Most preferably, the limit bar 47 is welded or otherwise fixedly attached to the adjustment brace 23. The ends of the limit bar 47 may take the form of outwardly extending anchor plates 49, having openings formed therein to receive hooks 31 of the securing strap 18.

The seat 21 is securely pivotally attached to the adjustment brace 23, and is pivotally movable relative thereto, so as to enable the hunter or naturalist to sit on the seat 21 or, alternatively, to lift the seat 21 up and stand on the standing platform 12, leaning comfortably against the vertical support 40.

The seat 21 is constructed of material similar to that of the standing platform 12 (although smaller in scale) in that the seat 21 includes an outer perimeter 50, a plurality of cross members 52, and a grate-like upper panel. The seat 21 is preferred to also include a pair of connector bars 19, extending outwardly from the perimeter 50, for facilitating pivotal attachment of the seat to the adjustment brace 23. The connector bars 19 may also extend across the central portion of the seat 21, as shown, for added strength and reinforcement. The connector bars 19 allow the seat 21 to be pivotally attached to the upper frame 45 at two spaced apart connections, for superior strength as compared to a single attachment point.

Additionally, in accordance with an alternative embodiment, the seat 21 may optionally include a fabric or cushioned top surface (not shown).

As further illustrated in FIG. 2, the apparatus 10, in accordance with the preferred embodiment, includes one or more adjustable extension arms. Examples of suitable extension arms are shown at 25 and 26, which fit telescopically inside of and extend outwardly from spaced-apart side segments of the adjustment brace 23. The extension arms 25 and 26 are constructed of material similar to that of the adjustment brace 23, although slightly smaller in cross-section. As noted, the end portions of the extension arms 25 and 26 slide telescopically in and out of the open ends of the adjustment brace, providing for a plurality of extendable positions. The extension arms 25 and 26 are adjustably secured to the adjustment brace 23 by way of tension knobs 22 and 24. The tension knobs 22, 24 include threaded shafts extending downwardly, which fit into corresponding threaded bosses on the brace 23. The tension knobs 22, 24 are able to be manipulated by the hunter or naturalist in either the seated or standing position.

While the preferred embodiment of the apparatus 10, depicts the general shape of the adjustment brace 23 and the extension arms 25 and 26 to be substantially box-like, for which tension knobs 22 and 24 are suitable for adjustment; an alternative embodiment of the apparatus 10 may include a substantially cylindrical tube-like configuration for said brace 23 and arms 25 & 26, whereby alternative structures other than tension knobs 22 & 24 may be used, such as tension clamps or pressure twist grips.

Located on the upper portion of the extension arm 26 is an adjustable first implement rest 30, which may be used to support a hunting bow or pack. Although the first implement rest 30 is fixably attached to the extension arm 26, the mounting bracket 28 permits the rest 30 to rotate, thereby enabling a hunter to rest a bow at any desired angle. While, according to the preferred embodiment, the first implement rest 30 is substantially wishbone-shaped and constructed of plastic-coated metal, alternative embodiments may include a cradle-shaped rest (not shown). The first implement rest 30 may alternatively be constructed from a strong plastic or polymer.

The other extension arm 25 is substantially L-shaped and includes additional components such as tension knobs 33 and 35, a height-adjustable elongate member 27, a swivel arm 29, rotatable mounting bracket 37 and a second implement rest 48. The height-adjustable elongate member 27 engages the extension arm 25 similar to that of the engagement between the extension arm 25 and the adjustment brace 23, and incorporates similar construction as well as similar alternative embodiments.

As illustrated in FIG. 2, in the depicted embodiment, the extension arm 25 is substantially L-shaped; however, as an alternative embodiment, the extension arm 25 may be constructed of another varying shape such as a substantially J or S-shaped member, or may be angled upwardly from the adjustment brace 23.

The swivel arm 29 is rotatably attached to the height-adjustable elongate member 27 by a tension knob 35, which permits fore and aft rotation relative to the hunter or naturalist. The swivel arm 29 is constructed of material in kind to that of the aforementioned ladder 11 and adjustment brace 23. The swivel arm 29 is substantially L-shaped and engages a mounting bracket 37 which rotatably secures a second implement rest 48, for supporting part of a gun or camera lens thereon. The mounting bracket 37 is similar to that of the mounting bracket 28 secured to the extension arm 26.

The second implement rest 48 is preferably constructed of metal, a strong plastic, or plastic-coated metal. The rest 48 is substantially V-shaped, and is rotatably mounted to the swivel arm 29, to permit the hunter or naturalist to rotatably adjust the rest 48, through a full range of 360 degrees.

Although the present invention has been described herein with respect to a number of specific illustrative embodiments, the foregoing description is intended to illustrate, rather than to limit the invention. Those skilled in the art will realize that many modifications of the preferred embodiment could be made which would be operable.

What is claimed is:

1. A portable ladder stand comprising:
   an upper ladder member comprising:
      parallel vertical rail members and a plurality of horizontal step members interconnecting said vertical rail members respectively, said vertical rail members having a bottom and top end respectively, each bottom end having a female socket opening where each socket opening has a same first cross-sectional shape respectively;
   an upper frame assembly nestingly attachable to the upper ladder member;
   a standing platform operatively attachable to the upper frame assembly;
   a seat platform operatively mounted on the upper frame assembly;
   a lower ladder member comprising;
      a first lower ladder rail having a top end with a tip having a first male cross-sectional shape;
      a second lower ladder rail having a top end with a second tip having a second male cross-sectional shape being a different cross-section from the first male cross-sectional shape, wherein the second male cross-sectional shape of the second tip is substantially similar to the first cross-sectional shape of each female socket opening of the upper ladder member and the first tip is configured to fit securely within the first cross-sectional shape despite having a different cross-sectional shape; and
      a cylindrical male connection peg defines the shape on the top end of the first lower ladder rail member; and a square male connection peg defines the shape on the top end of the second lower ladder rail member, a plurality of rungs extend between and interconnect the first and second rails of the lower ladder member; and a bottom end of each of the respective lower ladder rail members is capable of being situated in contact with a supporting substrate, where the bottom ends of the rail members of the upper ladder member respectively are capable of nestingly connecting with the top ends of the rail members of the extension member respectively, and the top ends of the rail members of the upper ladder member are capable of being connected with the upper frame assembly, an extension member comprising;

a bottom end on each of a first and second extension rail member which is capable of nestingly connecting with the top ends of the lower ladder rail members respectively, a first and second extension member female connection socket at the bottom end of each extension rail member respectively, wherein the first extension member female connection socket has the same first cross-sectional shape of the female socket opening of the upper ladder segment and the second extension member female connection socket has a second cross-sectional shaped socket opening which has a different cross-sectional shape from the first cross-sectional shape, a square male connection peg defines the shape on each top end of the extension rail members respectively, wherein the respective square male connection pegs of the ladder extension member are dimensioned to fit inside the first cross-sectional shaped socket openings of the upper ladder member, the first extension member female connection socket further has a circular cross-sectional shaped socket opening and the second extension member female connection socket has a square cross-sectional socket opening, wherein the circular socket opening is dimensioned such that said circular socket opening is only capable of receiving the cylindrical shaped male connection peg therein, and wherein the square socket opening is dimensioned such that said square socket opening is capable of receiving either one of the square and cylindrical male connection pegs therein; and wherein the cylindrical male connection peg and the square male connection peg of the lower ladder member rails are capable of fitting inside either one of the extension member female connection sockets and the female connection sockets of the upper ladder assembly.

2. The ladder stand of claim 1, wherein the portable ladder stand comprises interconnecting members that are hingedly attached.

3. The ladder stand of claim 1, further comprising a plurality of securing members for removably attaching said ladder stand to a support structure.

4. The ladder stand of claim 1, further comprising an anchor arm wherein the anchor arm is removably attached to the ladder stand, said anchor arm having a securing member attached thereto at an end of the anchor arm opposite the end of the arm which is removably attached to the ladder stand.

5. The ladder stand of claim 1, wherein the standing platform comprises a substantially U-shaped perimeter, a plurality of cross members connecting opposite sides of said standing platform, and a grate-like top surface fixedly attached to said cross members.

6. The ladder stand of claim 5, wherein the grate-like top surface comprises one of either a metal grate, heavy-gauge screen, vented aluminum, high-strength plastic or wood.

7. The ladder stand of claim 5, wherein the standing platform is connected to the upper frame assembly with suspension cables at the end of the standing platform opposite the end that is pivotally connected to the upper ladder segment, wherein the suspension cables are dimensioned such that the standing platform is positioned in a parallel position with a horizontal member of the upper frame assembly, below the horizontal member when the suspension cables are fully extended.

8. The ladder stand of claim 1, where the upper frame assembly comprises:

a pair of spaced-apart L-shaped reinforcing rails nestingly engaged with the vertical parallel rails of the upper ladder member respectively;

a U-shaped adjustment brace being fixedly attached to the reinforcing rails:

support studs formed integrally thereon, a limit bar fixedly attached thereto and spaced-apart side members;

an angular blade, wherein the angular blade is fixedly attached to the support studs of the adjustment brace, a securing strap attached to said angular blade, and wherein the seat platform is pivotally attached to the adjustment brace.

9. The ladder stand of claim 8, wherein the upper frame assembly further comprises:

a first and second extension arm, said extension arms telescopically fitting inside the spaced-apart side members of the adjustment brace respectively, the first extension arm having a first implement rest and the second extension arm having a swivel arm mounted rotatably thereon, the swivel arm having a second implement rest rotatably attached thereto.

10. A portable ladder stand kit, comprising:

a plurality of ladder members including an upper member, a lower member, and an extension member, each of the ladder members include respective parallel vertical rail members and a plurality of respective horizontal step members in which said horizontal step members interconnect the respective parallel vertical rails, each vertical rail member having a bottom and top end;

an upper frame assembly nestingly attachable to the upper ladder member;

a standing platform operatively attachable to the upper frame assembly; and a seat platform operatively mounted on the upper frame assembly;

wherein:

each bottom end of the respective rails of the upper member has a respective connection socket with a first shaped socket opening;

the bottom end of a first rail of the ladder extension member has a connection socket with the same shape as the first shaped socket opening;

the bottom end of a second rail of the ladder extension member has a female connection socket with a second shaped socket opening having a different cross-sectional shaped area from the first shaped socket opening;

the top ends of each of the rails of the ladder extension member have connection pegs with a cross-sectional shape corresponding to the first shaped socket opening;

the top end of a first rail of the lower member has a connection peg with a cross-sectional shape corresponding to the second shaped socket opening;

the top end of a second rail of the lower member has a connection peg with a cross-sectional shape corresponding to the first shaped socket opening; and the kit is configured to be assembled so that a user is able to select between placing the respective connection pegs of the lower member or between placing the respective connection pegs of the ladder extension member into the respective female connection sockets of the upper member since each respective connection peg of the lower member and extension member respectively are capable of being nestingly inserted into the respective connection sockets of the upper member; and the ladder extension member is configured so that the second shaped socket opening is only capable of receiving the connection peg with the cross-sectional shape corresponding to the second shaped socket opening.

11. The portable ladder stand kit according to claim 10, wherein the cross-sectional shape of the first shaped socket opening is square and the cross-sectional shape of the second shaped socket opening is circular.

12. The portable ladder stand kit according to claim 11, wherein the diameter of the circular connection peg of the first rail of the lower member corresponds to the length of one side of the square shaped first socket opening such that the circular connect peg fits securely within the square shaped first socket opening.

13. The portable ladder stand kit according to claim 10, wherein each connection socket extends in the direction of a longitudinal axis of the rails.

\* \* \* \* \*